July 15, 1952      F. MALZACHER      2,603,465

AERATING DEVICE

Filed Feb. 17, 1950      2 SHEETS—SHEET 1

INVENTOR.
Fred Malzacher
BY
Norman N. Holland
ATTORNEY

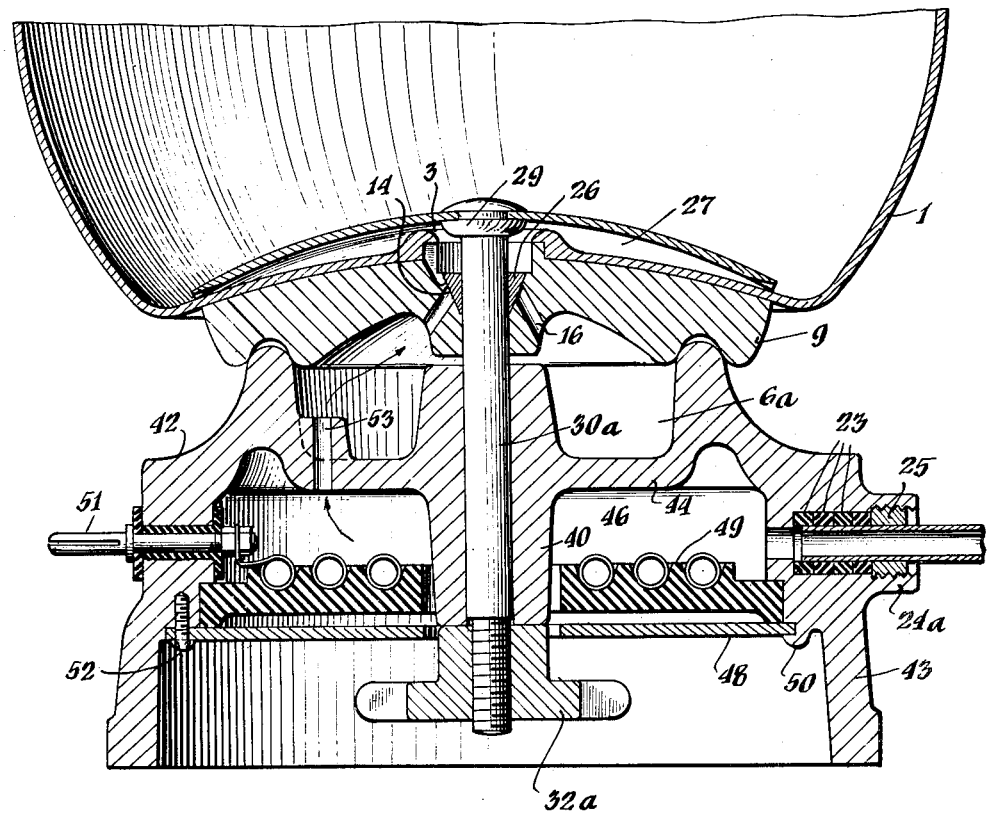

Patented July 15, 1952

2,603,465

UNITED STATES PATENT OFFICE 2,603,465

AERATING DEVICE

Fred Malzacher, Elmhurst, N. Y.

Application February 17, 1950, Serial No. 144,753

9 Claims. (Cl. 261—14)

The present invention relates generally to aerating devices and more particularly to a new and improved device adapted to supply fluids such as gases or liquids to a substance which is being mixed or beaten in a bowl.

It is recognized by those skilled in the culinary art that the introduction of air into substances such as cake mixtures, egg-whites, batters and the like while they are being mixed imparts to the resulting cake, biscuits or pastry, superior qualities of "lightness," "fluffiness," and delicacy. Considerable difficulty has been encountered, however, in providing a satisfactory aerating device which could be employed successfully with mixing bowls of the types commonly used by housewives, bakeries, and the like.

Most prior aerating devices have proven unsatisfactory in several respects. A major defect has been their failure to supply air evenly to the material being mixed or agitated. Lack of uniform supply results in the aeration of only a part of the substance being mixed. Another disadvantage of past devices has been their complicated designs; structures embodying numerous delicate parts made them unduly expensive to manufacture and subject to objectionable maintenance difficulties. A tendency for an air inlet passage to become clogged by the material presented still another objection to aerating devices produced heretofore.

The present invention aims to overcome or minimize the above and other difficulties by providing a new and improved device adapted to supply air or liquid, either heated or cool, uniformly to the interior of a bowl or container. It contemplates a relatively simple structure with a minimum of parts, which will give durable service and yet be inexpensive to manufacture; the new and improved device may be readily assembled and disassembled without requiring any special skill on the part of a user.

An object of the present invention is to provide a new and improved aerating device adapted for use with mixing bowls and the like.

Another object of the invention is to provide an aerating device adapted to distribute air uniformly to the interior of a bowl or container.

Another object of the invention is to provide a fluid supplying device that is relatively simple in construction and operation, yet sturdy and inexpensive to manufacture.

Still another object of the invention is to provide an aerating device that may heat the fluid prior to its entry into a container.

Another object of the present invention is to provide an air supplying device that will not readily become clogged by the substance being treated.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 4 is a sectional view of a device similar to that of Fig. 1 but which includes a fluid heating means.

While the present device is useful for supplying fluids to various substances, and may be used with any appropriate container, for purposes of convenience it will be illustrated and described chiefly in connection with a mixing bowl and for supplying air to a dough therein.

Figure 1:
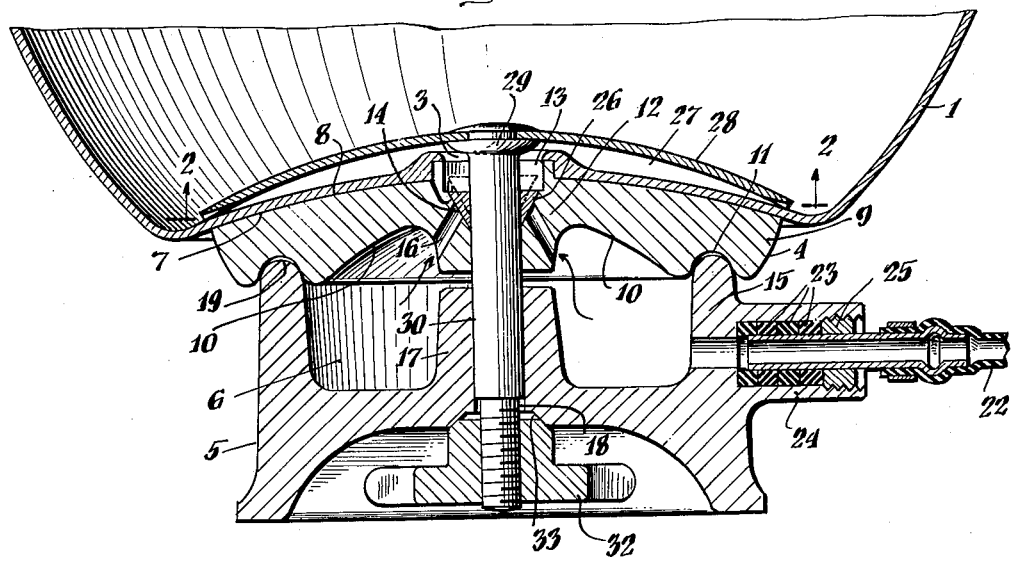
Fig. 1 is a sectional view of the present device as it may be used with a mixing bowl.

Referring to Fig. 1, there is shown a mixing bowl 1 adapted to contain a supply of dough to be aerated. The bowl 1 has an aperture 3 in its lower portion facilitating detachable mounting upon a seating member 4. The latter member 4 may be detachably mounted on a base member 5. Members 4 and 5 cooperate to form an air chamber 6 and are preferably formed of metal castings or forgings, but they may be made of wood, plastic or other suitable material.

Seating member 4 is shown with an upper bowl-seating surface 7 corresponding generally with the concavity or angulation of the underside 8 of the bowl to be supported, a side portion 9, a lower face 10 having an annular base-seating recess or groove 11 extending therearound, and a central portion 12 with a recess 13. An upper wall portion of the central portion 12 is preferably tapered so as to provide an inverted frusto-conical seat 14 for an air controlling valve 26; the lower wall of the central portion 12 may be substantially vertical. Extending through the wall of center portion 12 are shown a plurality of ports or air inlet apertures 16. In the illustrated embodiment, ports 16 are obliquely extending.

Figure 3:
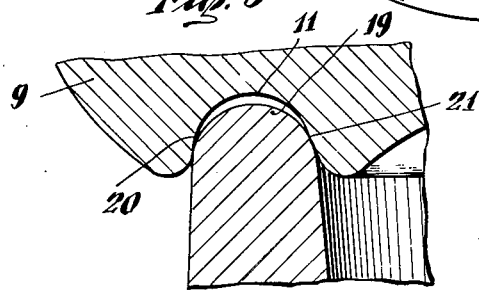
Fig. 3 is an enlarged fragmentary sectional view of a portion of the device illustrated in Fig. 1, showing sealing contacts between a seating member and a base member.

The base member 5 which cooperates with the seating member 4 to form the air chamber 6 has an outer wall portion 15 preferably annular in outer contour and a center portion 17 having an opening 18 therethrough. The upper edge 19 of outer wall portion 15 fits into recess 11 of the seating member 4, in a sort of tongue and groove relation to form an air tight seal between the seating member 4 and the base member 5. Referring to Fig. 3, it will be seen that in the preferred embodiment the groove 11 and the tongue or edge 19 do not make contact over their entire surface areas. Rather they make contact and form air tight seals at zones 20 and 21, each of which extends circumferentially around the seating and base members. This feature facilitates manufacturing operations and provides a plurality of seating surfaces which cooperate to minimize leakage of fluid out of the chamber 6. It will be clear that the recess 11 and the mating projection 19 could be interchanged so as to have the recess on the base member 5 and the projection depending from the seating member 4.

Air may be supplied to the chamber 6 from a hose 22 shown connected with an inlet opening 23 of a conduit 24 formed with and projecting from the base member 5. Any suitable means 25 may be used to detachably secure the hose in position.

Air passes from the chamber 6 through the inlet aperture 16, past the valve 26, and into a chamber 27 between the bowl wall and an air distributing plate member 28. The plate 28 is shown provided with an opening in its center portion and mounted on an end portion 29 of a bolt 30 which serves to hold the plate 28 firmly against a wall of the bowl. The embodiment of Fig. 1 shows the plate 28 as generally convex or dome-shaped to cooperate with the bowl wall in forming the chamber 27; the plate 28 and bowl walls may, of course, have any suitable configurations.

From the chamber 27, beneath the plate 28, air passes through a plurality of circumferentially spaced, generally radially extending slits or openings 31 in the plate 28. Outer edges of the plate 28 intermediate the openings 31 are pulled firmly against the bowl wall by bolt 30 and its handwheel or nut 32, and hence air normally emerges from the chamber 27 only through the openings 31. The openings 31 distribute the air evenly to the substance being mixed or whipped in the bowl.

When the handle 32 is tightened to bear against the grooved seat 33 of the base member 5 the constituent members of the aerating device then are positioned in operative relation one to the other. The seating member 4 makes sealing contact with the base member 5 at annular zones 20 and 21 and outer portions of the plate 28 are pulled against the bottom of the bowl 1.

To disassemble the device, the handle 32 may be turned so as to disengage it from the threaded portion of bolt 30. The bowl 1 and seating member 4, which normally remains assembled therewith, may then be lifted from the base member 5. The plate member 28 with bolt 30 may then be lifted out of the aperture in the bowl wall and seating member. The valve member 26 may be slid off the bolt at this time. To assemble, the above process is reversed.

Slidably mounted on the bolt 30 there may be provided an air valve 26 of generally inverted frustro-conical shape. As illustrated in Fig. 1, in a normally closed position the valve makes sealing contact with complementary walls of the valve seat 14, closing the air inlet passages 16. When air of a suitable pressure is introduced through the inlet passages 16 and presses against the sides of the valve 26, said valve tends to raise on the bolt member 30 to the position indicated in dotted outline, admitting air to the chamber 27. The bolt 30 thus serves as a guide for the air controlling valve 26 so that it may seat and unseat correctly at all times. When the air supply is cut off, gravity causes the valve to lower along the guide bolt 30 and close the inlet ports 16 against leakage of the contents of the bowl therein.

In operation, the lateral inlet conduit 24 may be connected to a source of air pressure by a flexible hose 22 or other suitable connection. When the air is turned on it passes through the conduit to the large chamber 6 and enters the air inlet passages 16. The pressure of the air against its inclined walls raises the valve 26, permitting air to flow past it and into the chamber 27. Air escapes from the chamber 27 through the recesses 31 which are uniformly spaced around the interior of the bowl and adjacent its sides. In this way, the substance being mixed or whipped in the bowl may be aerated uniformly and completely by a plurality of air streams injected into it from below.

Figure 2:
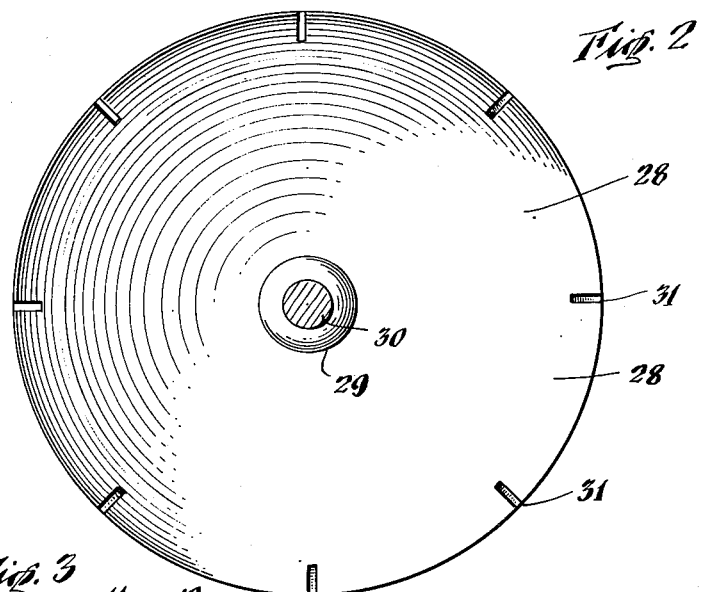
Fig. 2 is a view along line 2—2 of Fig. 1.

In some instances it may be desired to heat the air prior to delivery of it to a mixing bowl and in Fig. 4 there is illustrated means for achieving this. The structure there shown embodies an upper portion generally similar to that of Figs. 1–3; air passes into the bowl 1 through the chamber 27 beneath the plate 28, the valve 26 preventing any backflow of material through the ports 16 of the member 4 into the air chamber 6a.

In the form shown in Fig. 4 the shaft 30a which guides the valve 26 is similar to that of Fig. 4 but is longer and extends through an extension 40 of the central shaft supporting portion. A hand wheel 32a serves to pull firmly together against each other the upper seating member 4 and the base or lower member 42. The wall portions 43 of the base member 42 extend a greater distance downwardly below the horizontal wall 44 than in the form shown in Fig. 1, and form an air heating compartment 46, which is closed at its underside by a plate 48. The plate 48 may be inserted into its seat and then turned so as to rest against lugs 50, being thereafter secured by screws 52.

Air entering the heater compartment 46 through the base connection 24a passes over an electric heater 49, which may be connected through a wall of the base member with an exterior plug connection 51. The heater may be maintained at any suitable temperature. Heated air flows through an opening 53 into the exterior air chamber 6a and from there into the bowl 1 in a manner similar to that described in connection with Figs. 1–3. While the heater could be placed directly within the chamber 6 of Fig. 1, the construction of Fig. 4 is preferred as there may thus be provided a somewhat larger compartment 46, and manufacturing and maintenance problems are simplified.

It will be seen that the present invention is an aerating device of a rugged yet simple construction which permits easy assembly and disassembly. The device provides for complete aeration of the substance or liquid in the bowl, by either heated or cool air. An automatic valve assembly prevents the substance undergoing aeration from reaching and clogging the inlet air passages. The device embodies relatively few constituent parts and for that reason is comparatively inexpensive to manufacture.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a device adapted to be utilized for supplying air to a mixing bowl, the combination of an inner member having a cavity therein for forming with an inner surface of said bowl an air chamber disposed interiorly of the bowl, a rod-like member extending from said first-mentioned member adapted to project through an opening in a said bowl, a valve member guided by and movable along said rod-like member, outer means extending about said rod-like member adapted to be positioned against an outer surface of a said bowl including an enclosed air receiving chamber and having a port therethrough adapted to be opened and closed by said valve member.

2. In a device adapted to be utilized for supplying air to a mixing bowl, the combination of an inner member having a cavity therein for forming with an inner wall of said bowl an air chamber disposed interiorly of the bowl, a rod-like guiding and connecting member extending from a central portion of said first-mentioned member adapted to project through an opening in a said bowl, a valve member guided by and movable along said rod-like member, a plurality of additional members adapted to be positioned exteriorly of a said bowl with one member resting against an outer wall of the bowl and together forming an air receiving chamber, one of said members having a port through a portion thereof adjacent said rod-like member adapted to be opened and closed by said valve member, and means for releasably retaining together said inner member and said plurality of additional members.

3. In a device adapted to be utilized for supplying air to a mixing bowl, the combination of a member having a cavity at the underside thereof for forming with an inner wall of said bowl an air chamber, a guiding and connecting member projecting from a central portion of said first-mentioned member adapted to extend through an opening in a said bowl, a valve member guided by and movable along said guiding and connecting member, a seating member extending around said guiding and connecting member adapted to rest against an outer wall of said bowl having a port through a portion thereof adjacent said guiding and connecting member adapted to be opened and closed by said valve member, a base member supported against said seating member and forming therewith an air receiving chamber, said base member and seating member resting against each other along a plurality of spaced annular areas for minimizing escape of air out of said chamber.

4. In a device adapted to be utilized for supplying air to a mixing bowl, the combination of a first member adapted to rest against and form with an inner wall a said bowl an air chamber, a rod-like guiding and connecting member secured adjacent one end thereof to and projecting from said first-mentioned member adapted to extend through an opening in a said bowl, a valve member guided by and movable along said rod-like member, a seating member extending about said rod-like member adapted to be positioned exteriorly of a said bowl and having a port through a portion thereof adjacent the rod-like member adapted to be opened and closed by said valve member, a base member extending about said rod-like member and in contact with said seating member forming therewith an air receiving chamber, and means for engaging the opposite end of said rod-like member and drawing said first member against said inner wall of the bowl and said seating and base members toward each other.

5. In a device of the class described, for supplying heated air to a mixing bowl, a member having a cavity therein and adapted to be positioned within a mixing bowl to form therewith an air chamber at the interior of said bowl, a rod projecting from said member adapted to extend through an opening in the bowl, a valve movable to and fro along said rod, means resting against an outer wall of the bowl adapted to form an air chamber at the exterior of said bowl and having a port adjacent said rod adapted to be closed by said valve and an inlet for admitting air to said exterior chamber, and a heater carried by said means and exposed to air delivered through said inlet to said exterior chamber.

6. In a device of the class described for supplying heated air to a mixing bowl, an inner member having a cavity therein and adapted to be positioned within a mixing bowl to form therewith an air chamber at the interior of said bowl, a rod projecting from said member adapted to extend through an opening in the bowl, a valve movable along said rod, a plurality of members extending about said rod adapted to cooperate with each other in forming an air chamber at the exterior of said bowl, one of said plurality of members having a surface conforming generally to an outer surface of the bowl for resting against the bowl and having an air outlet port adjacent said rod adapted to be closed by said valve and the other member having an air inlet port, a heater carried by one of said plurality of members below said exterior air chamber for heating air passing through the inlet port, and a plate forming with the heater carrying member an air heating compartment.

7. A device as claimed in claim 4, in which said base member has a recess therein, said opposite end of the rod-like member projects into the recess, and the means for engaging said opposite end is normally disposed in said recess.

8. A device as claimed in claim 1, in which said inner member has a depending skirt with a plurality of air-conducting recesses spaced about an edge portion thereof.

9. A device as claimed in claim 2, in which one of said plurality of additional members has an annular groove therein and the other has an annular ridge projecting into said groove, wall portions of said ridge and groove contacting each other along a plurality of radially spaced and generally annularly extending areas to minimize escape of air therebetween, the surfaces of said members being spaced from each other intermediate said annular areas.

FRED MALZACHER.

REFERENCES CITED

The following references are of record in the file of this patent:

UNITED STATES PATENTS

| Number | Name | Date |
|---|---|---|
| 213,309 | Wilcox | Mar. 18, 1879 |
| 237,150 | Williams | Feb. 1, 1882 |
| 785,622 | Longuemare et al. | Mar. 21, 1905 |
| 1,939,583 | Welshausen | Dec. 12, 1933 |
| 1,964,345 | Feller | June 26, 1934 |
| 2,072,691 | Stark | Mar. 2, 1937 |
| 2,074,597 | Stark | Mar. 23, 1937 |
| 2,076,979 | Christiensen | Apr. 13, 1937 |
| 2,345,081 | Ward | Mar. 28, 1944 |
| 2,371,431 | Di Pietro | Mar. 13, 1945 |

FOREIGN PATENTS

| Number | Country | Date |
|---|---|---|
| 475,242 | Great Britain | Nov. 16, 1937 |
| 777,175 | France | Nov. 26, 1934 |